(12) United States Patent
Paik

(10) Patent No.: US 6,275,696 B1
(45) Date of Patent: Aug. 14, 2001

(54) NO. 7 LEVEL 2 PROCESSING SYSTEM FOR A SWITCHING UNIT IN MOBILE COMMUNICATION AND METHOD OF CONTROL THEREOF

(75) Inventor: Hyun Soo Paik, Kyoungki-do (KR)

(73) Assignee: Hyundai Electronics Ind. Co., Ltd., Kyoungki-do (KR)

( * ) Notice: Subject to any disclaimer, the term of this patent is extended or adjusted under 35 U.S.C. 154(b) by 0 days.

(21) Appl. No.: 09/221,078

(22) Filed: Dec. 28, 1998

(30) Foreign Application Priority Data

Dec. 30, 1997 (KR) .................................. 97-79215

(51) Int. Cl.[7] .................................................. H04Q 7/20
(52) U.S. Cl. .................... 455/426; 455/445; 455/560; 370/313; 370/538
(58) Field of Search ................................ 455/426, 560, 455/445; 370/538, 543, 545, 522, 469, 313, 328

(56) References Cited

U.S. PATENT DOCUMENTS

| | | |
|---|---|---|
| 5,535,198 | 7/1996 | Baker et al. . |
| 5,655,215 | 8/1997 | Diachina et al. . |
| 5,757,813 * | 5/1998 | Raith ........................................ 371/5.5 |
| 5,923,649 * | 7/1999 | Raith ........................................ 370/328 |
| 6,078,584 * | 6/2000 | Mottishaw et al. ................... 370/385 |
| 6,175,557 * | 1/2001 | Diachina et al. ...................... 370/313 |

* cited by examiner

*Primary Examiner*—William Trost
*Assistant Examiner*—Marceau Milord
(74) *Attorney, Agent, or Firm*—J. Harold Nissen; Lackenbach Siegel

(57) ABSTRACT

The present invention is provided to process more than one level 2 protocols by implementing a signalling link of the level 2 at a message transfer part in a common channel signalling system. Internal devices within a central processing unit and a control function of a signalling link controller are initialized and data of the signalling link controller received at the central processing unit is processed for transmit/receive to/from the upper level. A state of a level 3 receiver buffer within the central processing unit is checked, a primitive of data which was received from a level 3 but not processed is analyzed, and the primitive is performed at the signalling link controller, wherein a plurality of level 2 protocols can be processed.

12 Claims, 13 Drawing Sheets

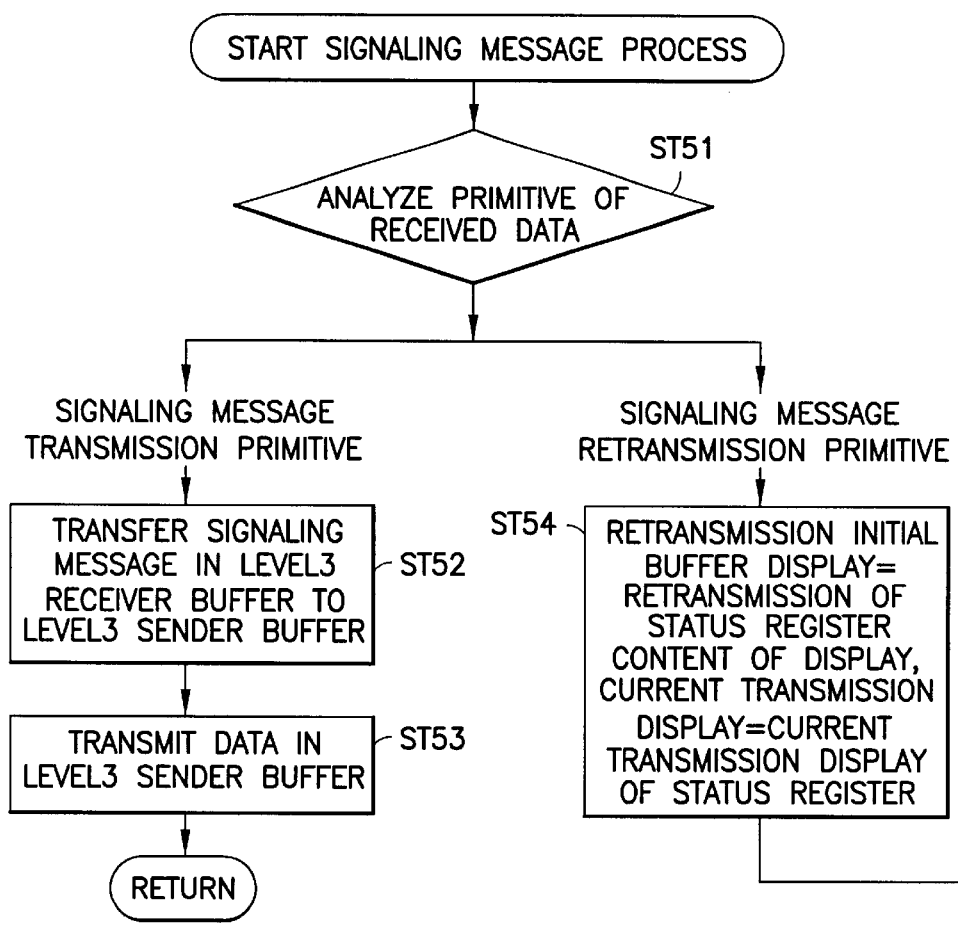
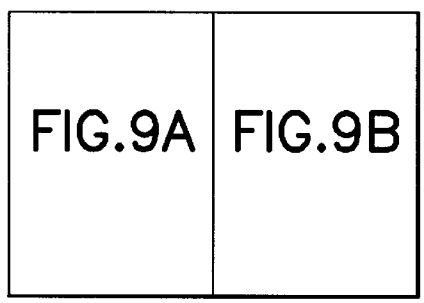
FIG.9
FIG.9A

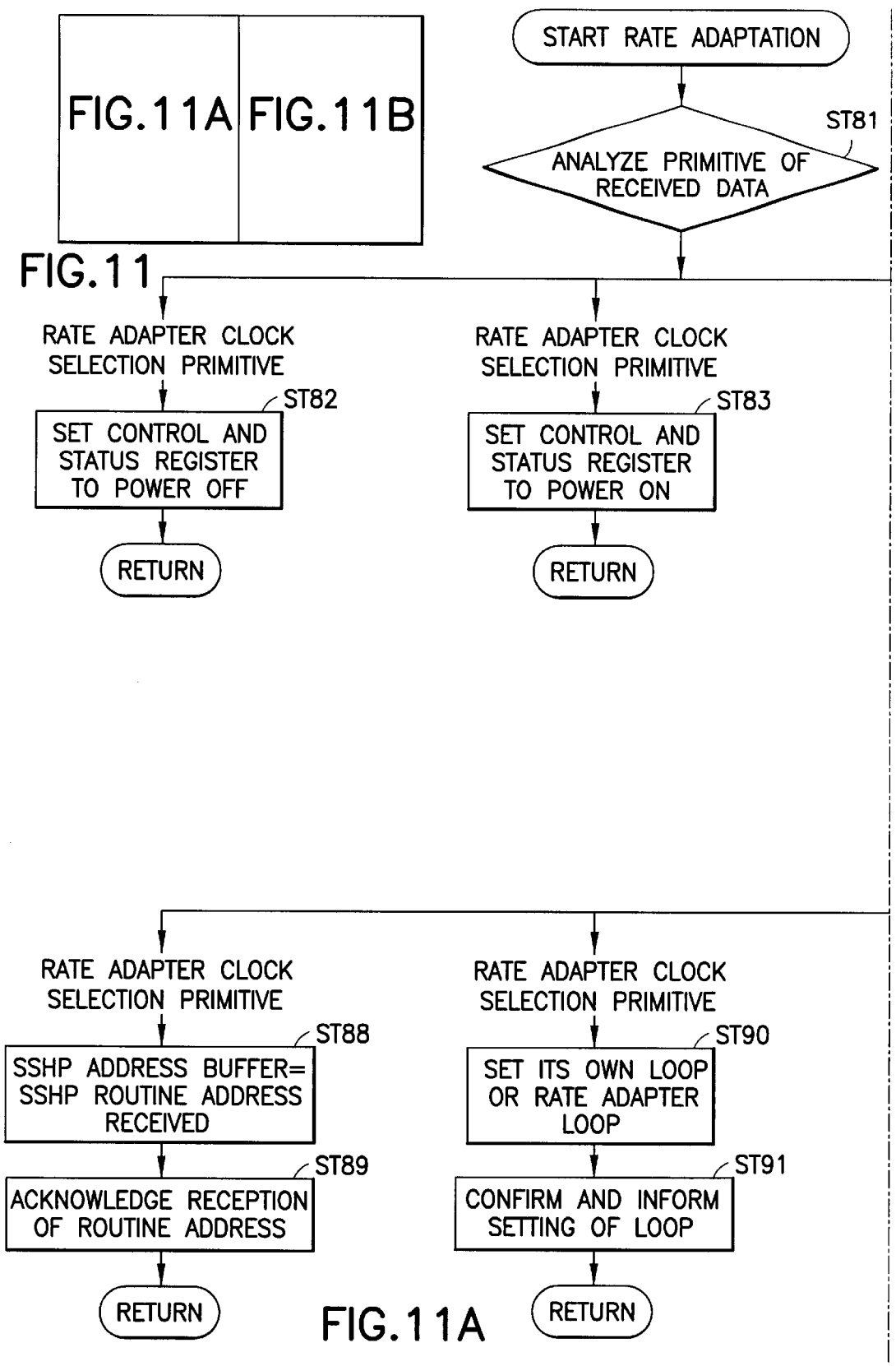

NO. 7 LEVEL 2 PROCESSING SYSTEM FOR A SWITCHING UNIT IN MOBILE COMMUNICATION AND METHOD OF CONTROL THEREOF

BACKGROUND OF THE INVENTION

1. Field of the Invention

The present invention relates to process of No. 7 level 2 in a mobile communication switching unit and more particularly to a No. 7 level 2 processing system for a switching unit in mobile communication and method of control thereof, for processing at least one level 2 protocol in real time by implementing a signalling link function corresponding to a level 2 at a message transfer part in a common channel signalling system.

2. Description of Related Art

Generally, a mobile communication system allows communications while in movement using mobile terminals. The mobile communication system includes a personal communication system (PCS) and a digital cellular system (DCS).

Typically, No. 7 signalling system corresponds to the control plane among three multiple planes (the user plane, the control plane, and the management plane) of Integrated Services Digital Network Protocol Reference Model (ISDN-PRM) provided by ISDN architecture based upon International Telecommunications Union, Telecommunication (ITU-T) Recommendation I.320. The No. 7 signalling system is responsible for providing network layer services (layers 1 to 3) of Open System Interconnection (OSI) 7 layers to end-users. The No. 7 signalling system is largely divided into two functions: a network service part (NSP) and a user part (UP). The NSP reliably transmits signalling messages and the UP is a functional entity which uses transmission ability provided by the NSP. The No. 7 signalling system has been developed for usage in digital communication networks and ISDN. It has hierarchical modules, is subjected to a common channel signalling system, and can be applied to an intelligent network such as a communication network contributing to special service. Compared with existing signalling systems, is the No. 7 signalling system can provide a great volume of signal capacity and high speed transmission, improve reliability via error detection and correction, and easily provide other new services (CUG, closed subscribers group, cashless telephone service, wide area receiving service, and so on).

No. 7 protocol hierarchical architecture should be prepared for interlock with other systems using a No. 7 protocol.

As shown in FIG. 1, a typical mobile communication system No. 7 protocol comprises: visitor location register (VLR) 1 which contains information related to the mobile unit's location which has entered the coverage area of mobile switching center (MSC) 2; the MSC 2 for transmitting call process requests from mobile units via public networks or private networks to thereby provide PCS service; ISDN user part 3 for providing ISDN service to subscribers; first and second transaction capability application parts (TCAP) 4 and 5 for processing respective commands from the VLR 1 and MSC 2 and transmitting respective results to signalling connection control part 6; signalling connection control part (SCCP) 6 for controlling connection of signals of the ISDN user part 3 and the first and second TCAPs 4 and 5 to message transfer part (MTP) 7; MTP 7 including level 3, 8, coupled to the ISDN user part 3 and SCCP 6 and consisting of a signalling network management part and a signaling message handling part, for defining procedures and functions related to an operation of transmitting signalling messages between signalling points on the signalling network, level 2, 9, for defining procedures and functions related to an operation of transmitting signalling messages via a single signalling data link, and level 1, 10, for defining physical and electrical properties of the signalling data link, thereby performing transmission of signaling messages.

In the No. 7 protocol architecture having such configuration, the signalling data link (SDL) is used for actual transmission of signalling messages and means a physical path consisting of digital or analog transmission media. The SDL is a bidirectional transmission line comprising two data channels which respectively operate in opposite directions to each other at the same speed. A signalling terminal (ST) allows messages to be reliably transmitted using the signalling data link and is a device for performing all functions defined by the level 2. A signalling link (SL) connects signalling points for the purpose of transmission of signalling messages and comprises the signalling data link and the signalling terminal.

FIG. 2 is a block diagram of a No. 7 level 2 processing system in a conventional mobile communication switching unit. As shown in FIG. 2, the conventional No. 7 level 2 processing system comprises: central processing unit 11 for overall controlling the level 2 processing system; clock generator 12 for generating clocks to the central processing unit 11; reset unit 13 for resetting the central processing unit 11; address encoder and decoder 14 coupled to the central processing unit 11, for encoding and decoding addresses; memory decoder 15 coupled to the central processing unit 11, for generating data transmission and confirm signals and decoding memory; read only memory (ROM) 16 for storing programs which are executed by central processing unit 11; status register 17 which embeds a status register to be processed by central processing unit 11; multi function peripheral (MFP) 18 coupled to central processing unit 11, for controlling peripheral units; direct memory access controller (DMAC) 19 for allowing central processing unit 11 to perform direct memory access to other units in the system; random access memory (RAM) 20 for storing data which has been processed by central processing unit 11; control register 21 for embedding a control register to be processed by central processing unit 11; first and second multi protocol communication controllers (MPCC) 22 and 23 for controlling protocol communications between central processing unit 11 and external units; signalling terminal group bus (STG BUS) matching unit 24 coupled to the first MPCC 21, for performing matching with an STG bus; alarm processing unit 25 for processing alarms generated in the system; and SDL matching unit 26 coupled to the second MPCC 23, for performing matching with SDL.

Such conventional system operates such that one level 2 protocol would be processed in one board. Specifically, by using central processing unit 11 made up of a 16-bit MC68000, MFP 18 made up of an MC68901, DMAC 19 made up of an MC68450, first and second MPCCs 22 and 23 made up of a BT68561 which can process a high-level data link control (HDLC) protocol, and firmware, one level 2 protocol is processed.

FIG. 3 is a flow chart illustrating the operation of a No. 7 level 2 processing system in a mobile communication switching unit according to conventional art. Central processing unit 11 initializes RAM 20 and hardware devices (ST1 and ST2), registers an interrupt service routine address (ST3), and prepares for reception of a message from an upper level (ST4). Central processing unit 11 checks an interrupt flag and receives the input data from the upper level to thereby perform the level 2 protocol defined in recommendations.

Central processing unit 11 then receives messages from the other's signalling link and a signalling message handling processor (SMHP) and transmits messages to the other office and the SMHP (ST5–ST9). Among auxiliary processors having respective various functions in the switching unit, the SMHP is for processing No. 7 messages and refers to a hardware board which actually receives and routes messages.

Once data is transmitted from central processing unit 11 to second MPCC 23, second MPCC 23 processes HDLC frames and sends them to SDL matching unit 26 for transmission. Central processing unit 11 then performs the level 2 protocol. If the processed data is normal and supposed to be sent to the upper level, central processing unit 11 finally sends the data to the upper level via first MPCC 22.

In the conventional system, however, internal circuits are embodied according to TTL (transistor-transistor logic). This causes a problem of requiring a great volume of space in case of processing at least two level 2 protocols within one board.

Additionally, the conventional system processes all level 2 protocols in software using a 16-bit central processing unit, so it needs 21 cycles when the central processing unit performs one command and uses 10 Mhz. Accordingly, the central processing unit needs about 2 microseconds for the process to thereby have performance of 0.5 MIPS (million instruction per second). However, when performing at least two level 2 protocols within one board, delay occurs in processing because volume of data to be processed increases four times. This causes deterioration of performance of the system.

SUMMARY OF THE INVENTION

Accordingly, the present invention is directed to a No. 7 level 2 processing system for a switching unit in mobile communication and method of control thereof that substantially obviates one or more of the limitations and disadvantages of the related art.

An objective of the present invention is to provide a No. 7 level 2 processing system for a switching unit in a mobile communication and method of control thereof, for processing at least one level 2 protocol in real time by implementing a signalling link function corresponding to a level 2 at a message transfer part in a common channel signalling system.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, a No. 7 level 2 processing system for a mobile communication switching unit comprises a central processing unit for overall controlling the level 2 processing system via a system bus, firmware ROM and RAM for storing programs and data, a signalling link controller for processing level 2 protocols which are signalling terminals under control of the central processing unit, and a rate adapter for extracting time slots from the signalling terminals processed at the signalling link controller and performing multiplexing and demultiplexing to allow packets to be processed.

In another aspect, the present invention provides a method of controlling a No. 7 level 2 processing system for a mobile communication switching unit. Internal devices within a central processing unit and a control function of a signalling link controller are initialized and data of the signalling link controller received at the central processing unit is processed for transmit/receive to/from the upper level. A state of a level 3 receiver buffer within the central processing unit is checked, a primitive of data which was received from a level 3 but not processed is analyzed, and the primitive is performed at the signalling link controller.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Reference will now be made in detail to the preferred embodiments of the present invention, examples of which are illustrated in the accompanying drawings.

The following description concerns one embodiment according to technological spirit of a No. 7 level 2 processing system for a mobile communication switching unit and method of control thereof according to the present invention.

Figure 1:
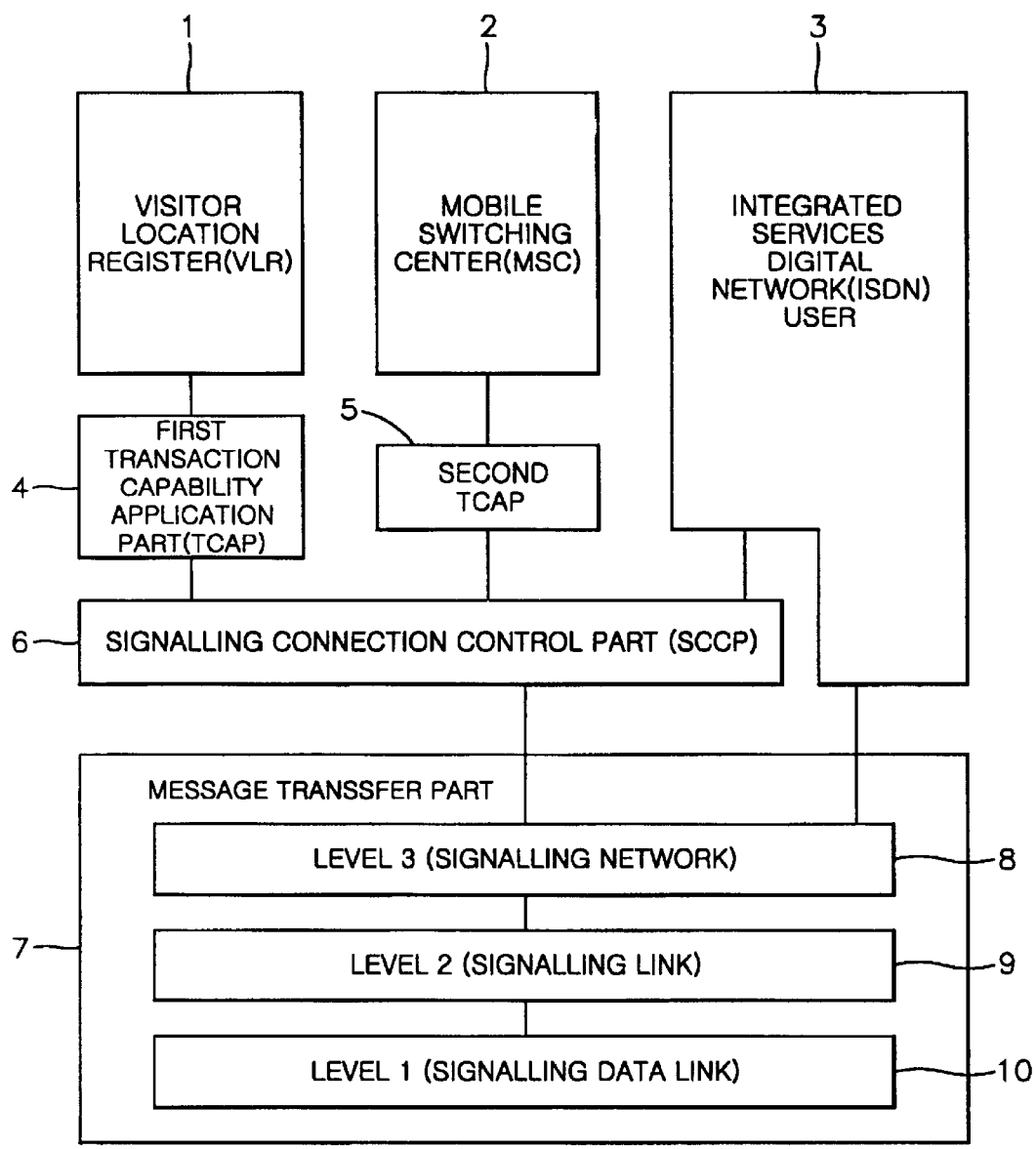
FIG. 1 is a block diagram illustrating a typical mobile communication system No. 7 protocol.
Figure 2:
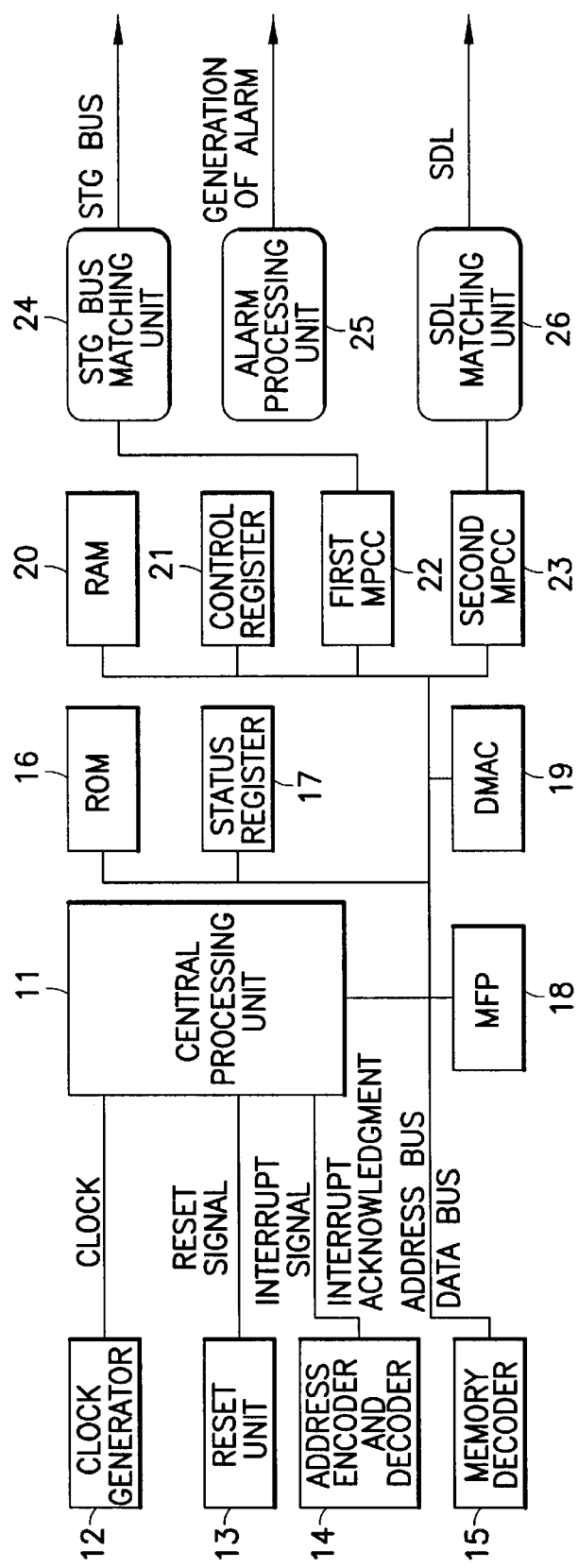
FIG. 2 is a block diagram illustrating a No. 7 level 2 processing system of a mobile communication switching unit according to prior art.
Figure 3:
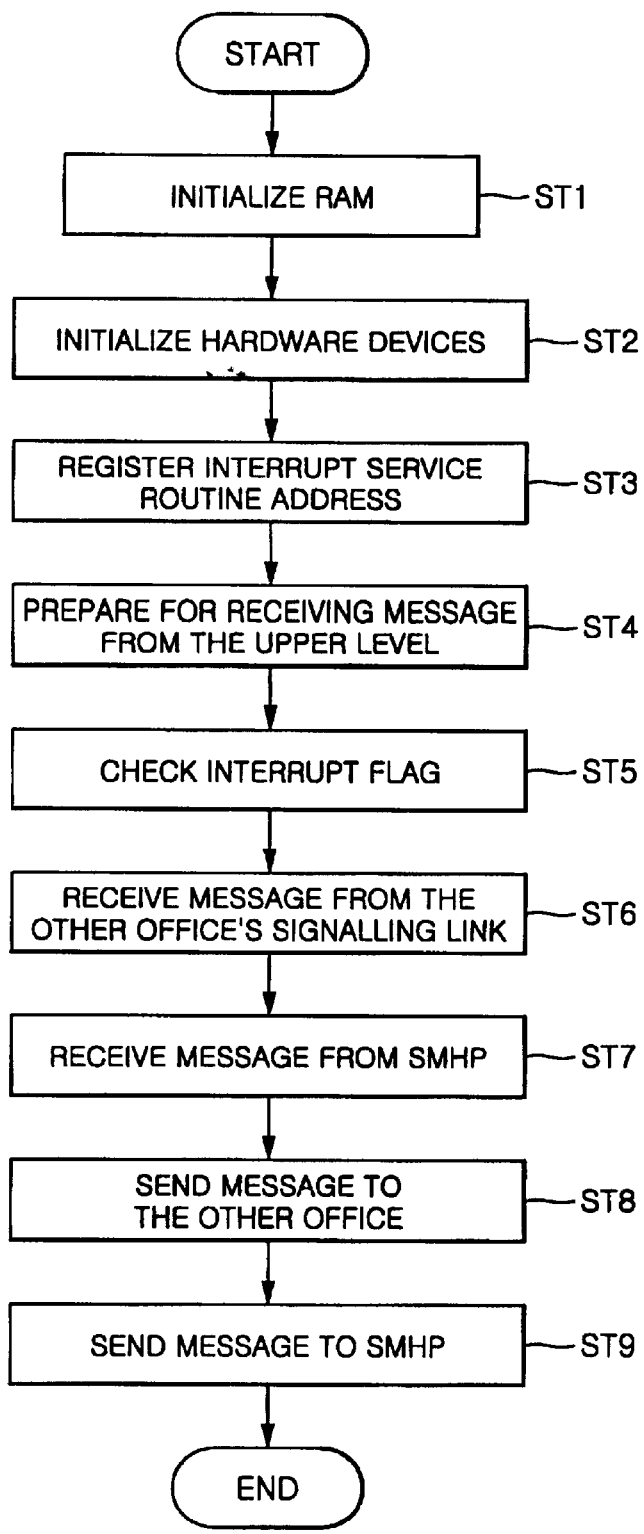
FIG. 3 is a flow chart illustrating a method of processing No. 7 level 2 in a mobile communication switching unit according to prior art.
Figure 4:
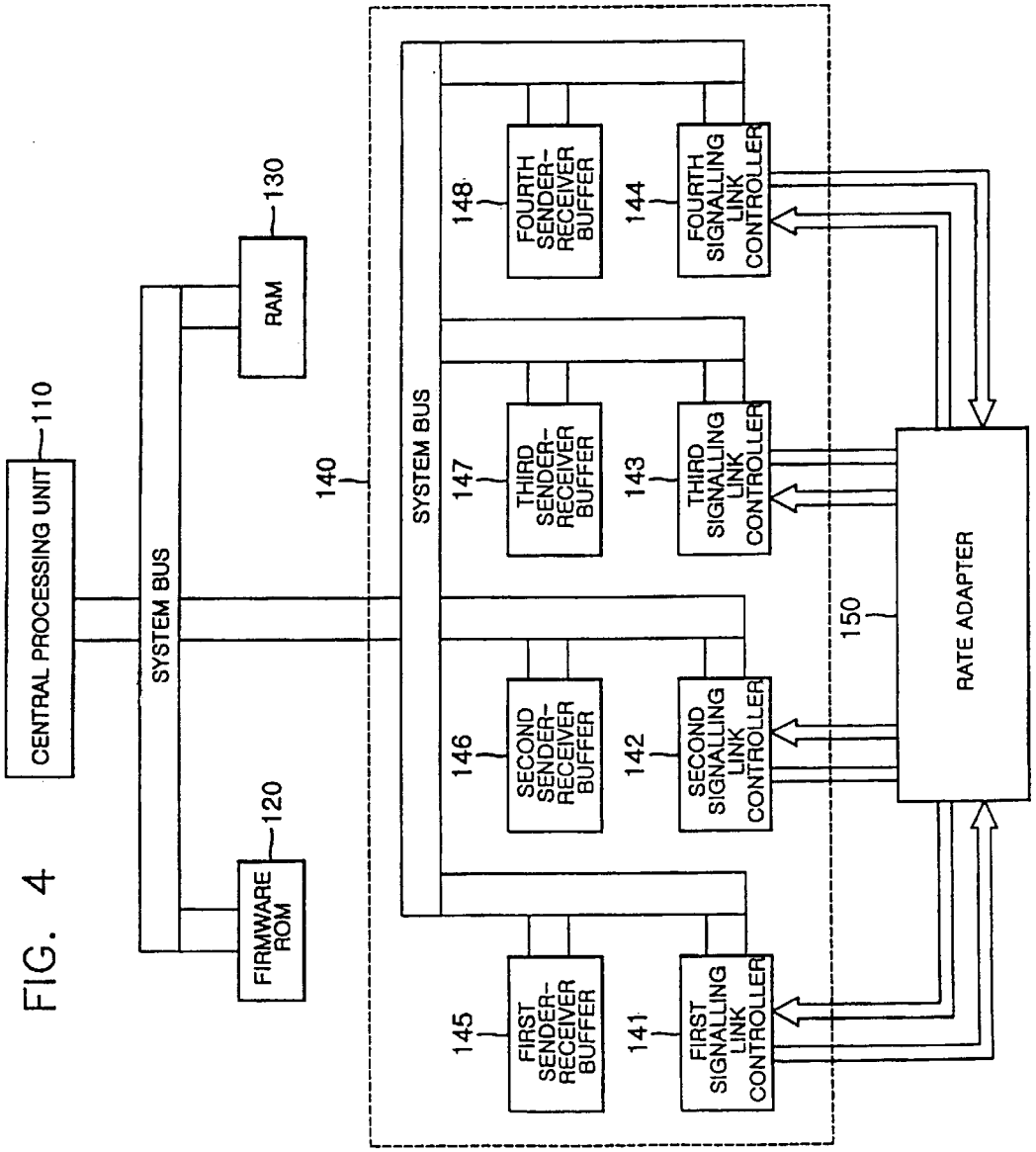
FIG. 4 is a block diagram illustrating a No. 7 level 2 processing system of a mobile communication switching unit according to the present invention.

FIG. 4 is a block diagram illustrating a No. 7 level 2 processing system of a mobile communication switching unit according to the present invention. As shown in FIG. 4, the No. 7 level 2 processing system comprises: central processing unit 110 for overall controlling the level 2 processing system via a system bus; ROM 120 for storing programs to be executed at central processing unit 110; RAM 130 for storing data which has been processed at central processing unit 110; signalling link controller 140 for processing level 2 protocols which are signalling terminals under control of central processing unit 110, the signalling link controller 140 comprising first to fourth signalling link controllers 141 to 144 for processing level 2 protocols which are signalling terminals under the control of central processing unit 110 and first to fourth sender/receiver buffers 145 to 148 for performing a buffering function for data transmission between central processing unit 110 and first to fourth signalling link controllers 141 to 144; and rate adapter 150 for extracting time slots from the processed signalling terminals by signalling link controller 140 and performing multiplexing and demultiplexing to allow packets to be processed.

Although not shown in the accompanying drawings, central processing unit 110 includes a serial communication controller (SCC) and first and second independent direct memory access controllers (IDMA) and has a level 3 sender/receiver buffer for processing level 3 signals.

Central processing unit 110 uses sender/receiver buffers 145–148 used by first to fourth signalling link controllers 141–144 to initialize pointers, sizes of messages, and status of buffers with respect to first to fourth signalling link controllers 141 to 144.

Signalling link controller 140 performs rate adaptation to provide a clock of 64 KHz or 56 KHz to each signalling terminal to thereby match each signalling terminal with a time switch & link (TSL). When a signalling system level 2 function board assembly (SSFA) is not connected, signalling link controller 140 reads an identifier (ID) of an SSFA slot from a back board and determines a time slot of a signalling terminal according to the ID.

Figure 5:
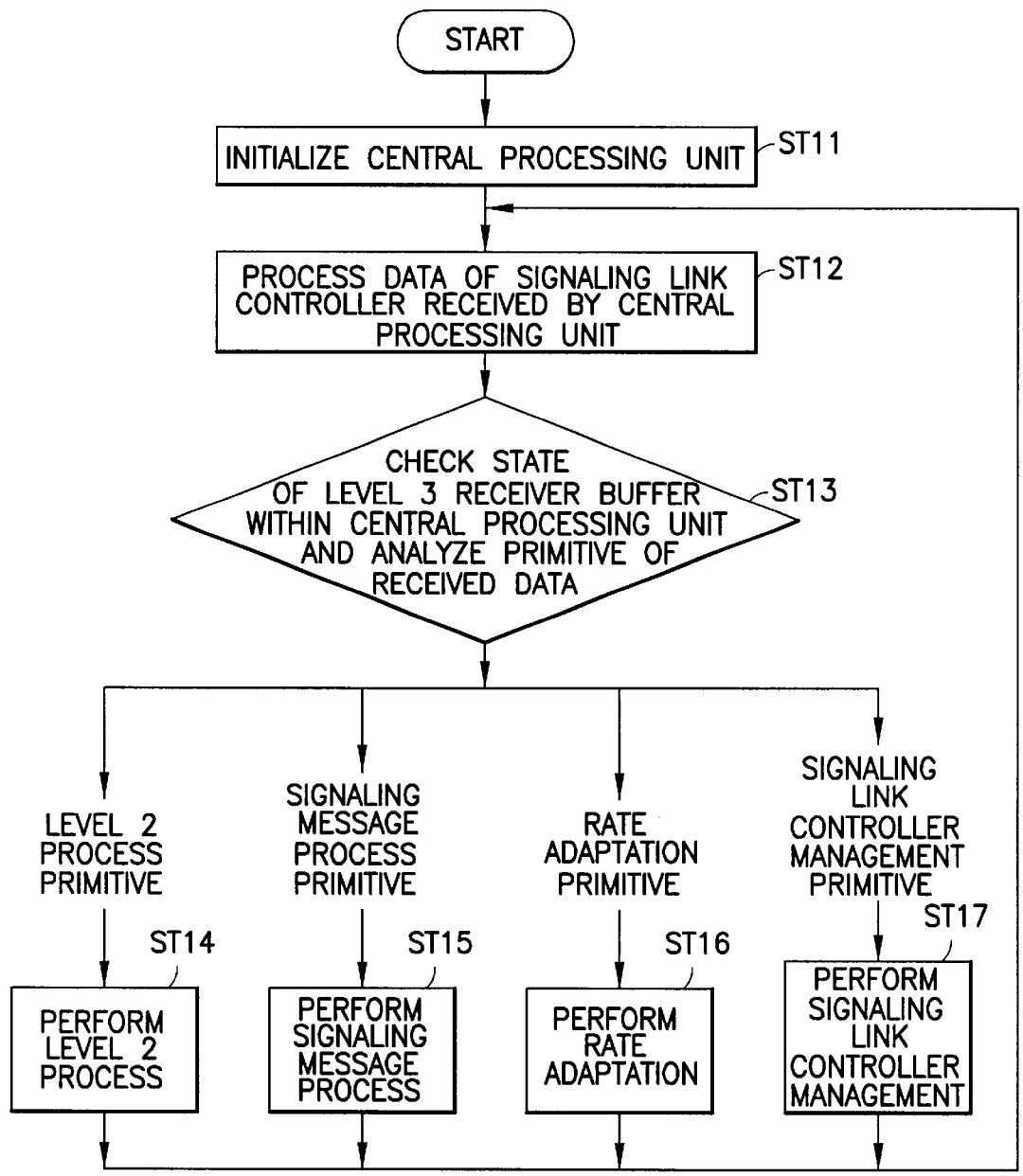
FIG. 5 is a flow chart illustrating the operation of a No. 7 level 2 processing system in a mobile communication switching unit according to the present invention.

The following table 1 shows a memory map stored in buffers of central processing unit 110 or signalling link controller 140 and used at level 2 firmware in the common channel signalling system.

switching unit according to the present invention. As shown in FIG. 5, the operation comprises the steps of: 1) initializing internal devices of central processing unit 110 and a control function of signalling link controller 140 (ST11); 2) after the step 1), processing data of signalling link controller received by central processing unit 110 to thereby perform transmit/receive to/from the upper level (ST12); 3) checking status of a level 3 receiver buffer within central processing unit 110 and analyzing a primitive of data which has been received from the level 3 but not processed (ST13); and 4) controlling the primitive to be performed at signalling link controller 140 according to the result of analyzing the primitive of the received data and returning to the step 2) (ST14–ST17).

In the step 4), if the primitive of the received data is a level 2 process primitive, a level 2 process for a signalling link is performed (ST14); if the primitive of the received data is a signalling message process primitive, a signalling message process is performed (ST15); if the primitive of the received data is a rate adaptation primitive, rate adaptation is performed to adjust processing speed in accordance with the level 2 or the level 3 (ST16); and if the primitive of the received data is a signalling link controller management primitive, a function for managing signalling link controller 140 is performed (ST17).

Central processing unit 110 initializes its internal devices and a control function of signalling link controller 140 to receive data from signalling link controller 140 via a plurality of sender/receiver buffers 145–148 (ST1). If central processing unit 110 receives the data from signalling link controller 140, it allows data to be transmitted/received to/from the level 3 (ST12).

The status of the level 3 receiver buffer within central processing unit 110 is checked and analyzed to determine whether there is any data which was not processed among the received signals from the level 3 (ST13). A primitive of the data which was not processed is analyzed and central processing unit 110 controls signalling link controller 140 to be capable of operating in accordance with the primitive for level 2 process, signalling message process, rate adaptation, or signalling link controller management (ST14–ST17).

Figure 6:
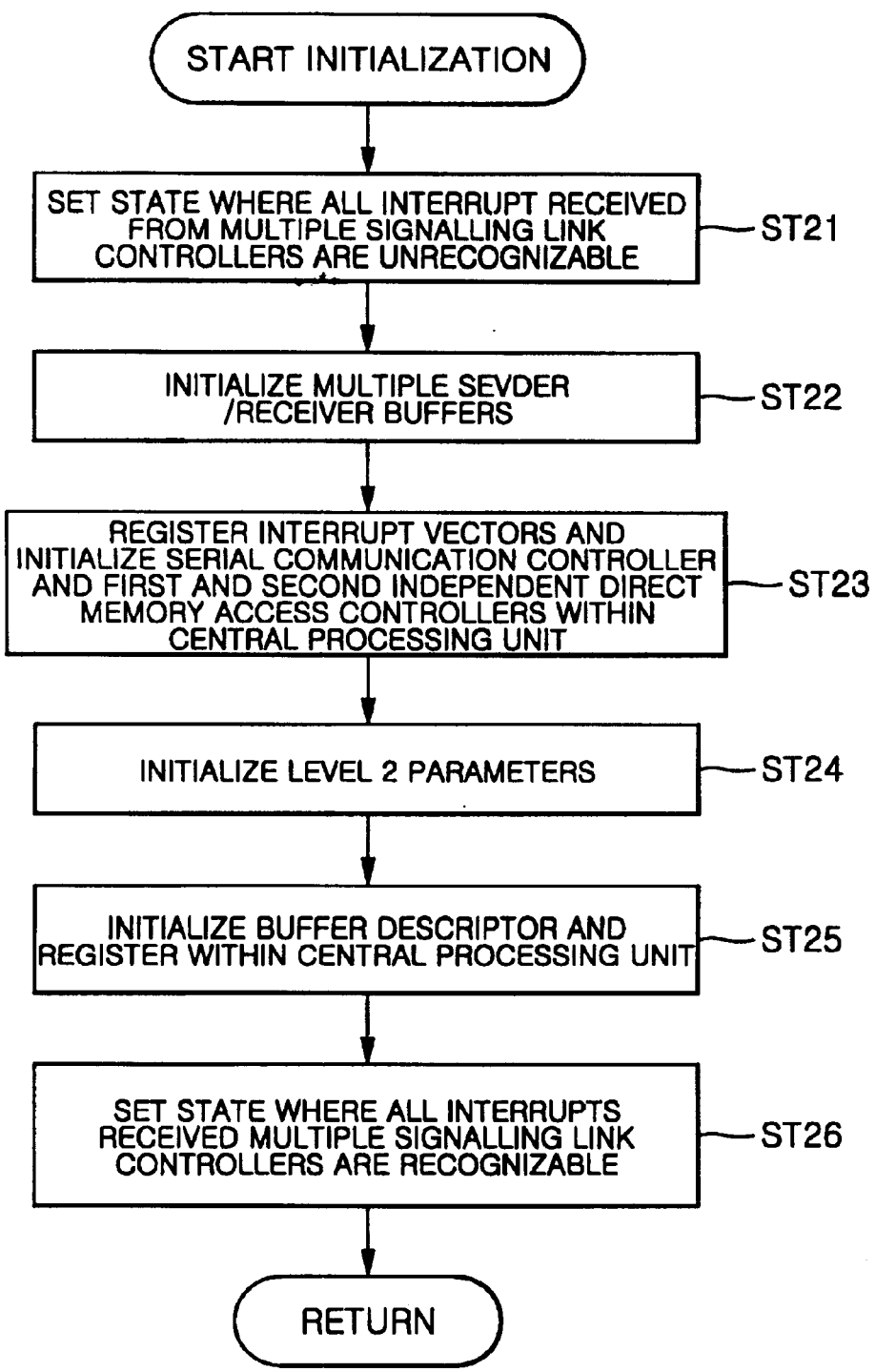
FIG. 6 is a flow chart illustrating the initializing step depicted in FIG. 5 in detail.

FIG. 6 is a flow chart illustrating the initializing step depicted in FIG. 5 in detail. As shown in FIG. 6, the

TABLE 1

Memory map for level 2 firmware

| 000000-080000 | RAM area | 200000-200200 | MK5027#2 | 360000-400000 | No use |
| 080000-0A0000 | ROM area | 200200-240000 | No use | 400000-400200 | MK5027#4 |
| 0A0000-100000 | No use | 240000-260000 | Buffer#2 | 400200-440000 | No use |
| 100000-100200 | MK5027#1 | 260000-300000 | No use | 440000-460000 | Buffer#4 |
| 100200-140000 | No use | 300000-300200 | MK5027#3 | 460000-500000 | No use |
| 140000-160000 | Buffer#1 | 300200-340000 | No use | 500000-600000 | RA |
| 160000-200000 | No use | 340000-360000 | Buffer#3 | 600000-600004 | Status buffer |

Since one processor board which processes an upper function of the No. 7 protocol sends and receives messages to and from four SSFA boards, each SSFA board must have its own address to communicate with the upper level. In other words, a unique address is assigned to each SSFA board and all devices within the SSFA board are assigned their own addresses to be permitted to control or access the memory which is assigned as in the memory map shown in the table 1 when performing internal operations.

FIG. 5 is a flow chart illustrating the operation of a No. 7 level 2 processing system in a mobile communication initializing step comprises the steps of: setting a control and status register (CSR) to an interrupt unrecognizable state to make all interrupts received from a plurality of signalling link controllers 141–145 to be unrecognized (ST21); after setting the register to the interrupt unrecognizable state, initiallizing a plurality of sender/receiver buffers, registering interrupt vectors, initiallizing a serial communication controller (SCC) and first and second independent direct memory access controllers (IDMA) within central processing unit 110, initiallizing parameters for the level 2 process, and initiallizing a buffer descriptor and register within central processing unit 110 (ST22–ST25); and, after the initialization, setting the control and status register (CSR) to an interrupt recognizable state to make all interrupts received from the plurality of signalling link controllers 141–145 to be recognized (ST26).

The central processing unit processes the level 2 protocol in the conventional art. On the other hand, according to the present invention, the level 2 protocol is processed by the signalling link controller 140 and the central processing unit 110 controls signalling link controller 140 and transmits/receives data to/from the upper level.

To perform such initiallizations, central processing unit 110 sets the control and status register to the interrupt unrecognizable state to allow the initiallizations (ST21).

First to fourth sender/receiver buffers 145–148 are initiallized for data transmission between central processing unit 110 and signalling link controller 140 (ST22).

Vector numbers are registered to permit central processing unit 110 to recognize interrupts of the first and second IDMAs. The interrupt vector indicates the case that a table index of an interrupt supported by central processing unit 110 has been fixed in a table storing a processing routine of each interrupt. The first and second IDMAs access memory during transfer of data. Since the IDMA accesses the memory instead that central processing unit 110 performs all processes, processing time during the transfer of data can be reduced. This results in reduction of load on central processing unit 110, thereby improving performance of the system.

While power is on, the serial communication controller in central processing unit 110 and a buffer used by the serial communication controller are initiallized for communication with the upper level 3. All buffers used by first to fourth signalling link controllers 141–144 are also initiallized (ST23).

Parameters of the level 2 which are used for signalling unit error rate monitoring (SUERM) and align error rate monitoring (AERM) are initiallized (ST24). The SUERM and AERM are functions used to ensure reliability related to the status of a link over the No. 7 protocol. The SUERM function calculates the number of errors in frames received during reference time. If a value of the calculated result exceeds a threshold, a relevant signalling link is determined to be instable, so a load of signalling messages transmitted over the link is transferred to another link and the load of the signalling message is returned to the original link after the link becomes normal.

SUERM and AERM parameters are set at registers in first to fourth signalling link controllers 141–144 in suit with hardware designed for internal registers of first to fourth signalling link controllers 141–144. The buffer descriptor and the register within central processing unit 110 are initiallized (ST25). The buffer descriptor is used for management of first to fourth sender/receiver buffers 145–148 and has information such as status and length of stored data and an address of a buffer where the data is stored.

After initiallizing the control and status register, a timer, and so on, the condition that signalling link controller 140 can perform the level 2 protocol function in normal would be established.

After the initiallizations are completed, communication with the level 3 can be allowed and the control and status register is reset to allow central processing unit 110 to be able to recognize interrupts of first to fourth signalling link controllers 141–144 (ST26).

Figure 7:
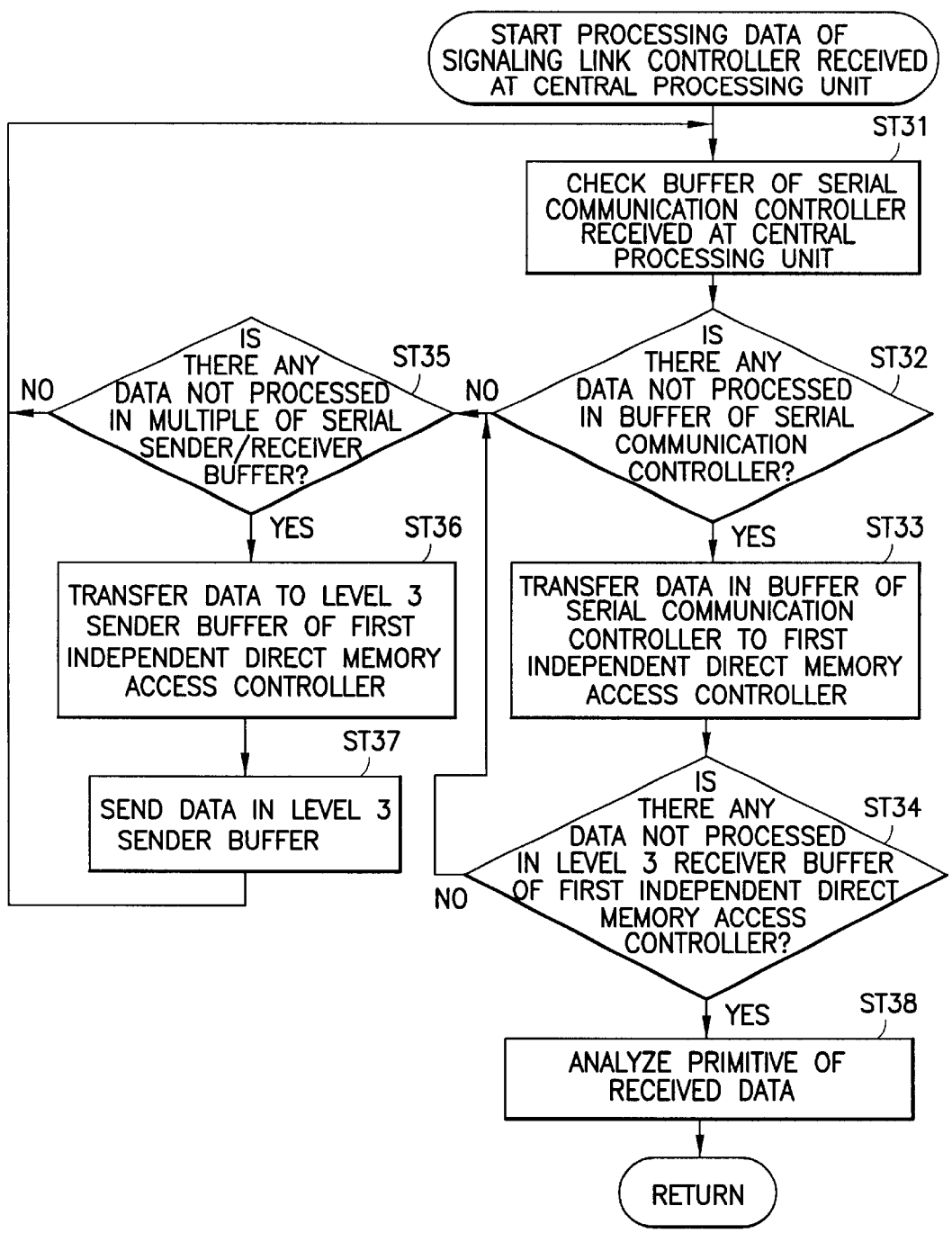
FIG. 7 is a flow chart illustrating in detail the step of 10 processing data of a signalling link controller received by a central processing unit depicted in FIG. 5.

FIG. 7 is a flow chart illustrating in detail the step of processing data of a signalling link controller received by a central processing unit depicted in FIG. 5. As shown in FIG. 7, the data processing step comprises the steps of: checking a buffer of the serial communication controller within central processing unit 110 to determine whether or not there is any data which has not been processed (ST31 and ST32); if there some data which has not been processed in the buffer of the serial communication controller, transferring the data in the serial communication controller's buffer to a first independent direct memory access controller and checking a level 3 receiver buffer of the first independent direct memory access controller to determine whether or not there is any data which has not been processed (ST33 and ST34); if there is no data which has not been processed in the serial communication controller's buffer or the level 3 receiver buffer, checking a plurality of sender/receiver buffers 145–148 to determine whether or not there is any data which has not been processed (ST35); if there is some data which has not been processed in the plurality of the sender/receiver buffers 145–148, transferring the data to the level 3 receiver buffer of a second independent direct memory access controller for transmission of the data and returning to the step of checking the buffer of the serial communication controller (ST36 and ST37); and, if there is some data which has not been processed in the level 3 receiver buffer, analyzing a primitive of the data received from the level 3 (ST38).

The first independent direct memory access controller transfers an inter processor communication (IPC) message from the level 3 to the level 2, which is received at the buffer of the serial communication controller, to a buffer which is capable of analyzing the message. The second independent direct memory access controller transfers a signalling message from the buffer for analyzing messages to first to fourth sender/receiver buffers 145–148 used by first to fourth signalling link controllers 141–144.

Central processing unit 110 registers the interrupt vectors during the initialization to allow the interrupts of the first and second independent direct memory access controllers to be used and clears interrupt mask bits of the control and status register in central processing unit 110 to allow all interrupts to be used.

In other words, if data is stored in the level 3 receiver buffer, the data is registered in a sender buffer of a related signalling link controller 141–144 among the first to fourth sender/receiver buffers 145–148 to allow signalling link controller 140 for transmission of the data. On the other hand, if the data is stored in the level 3 sender buffer, the data is registered in the serial communication controller for transmission of the data.

As illustrated above, the level 2 is activated to receive and store a physical address of the level 3 in a buffer memory to thereby communicate with the level 3. In case of sending data to the level 3, the physical address is used.

Figure 8:
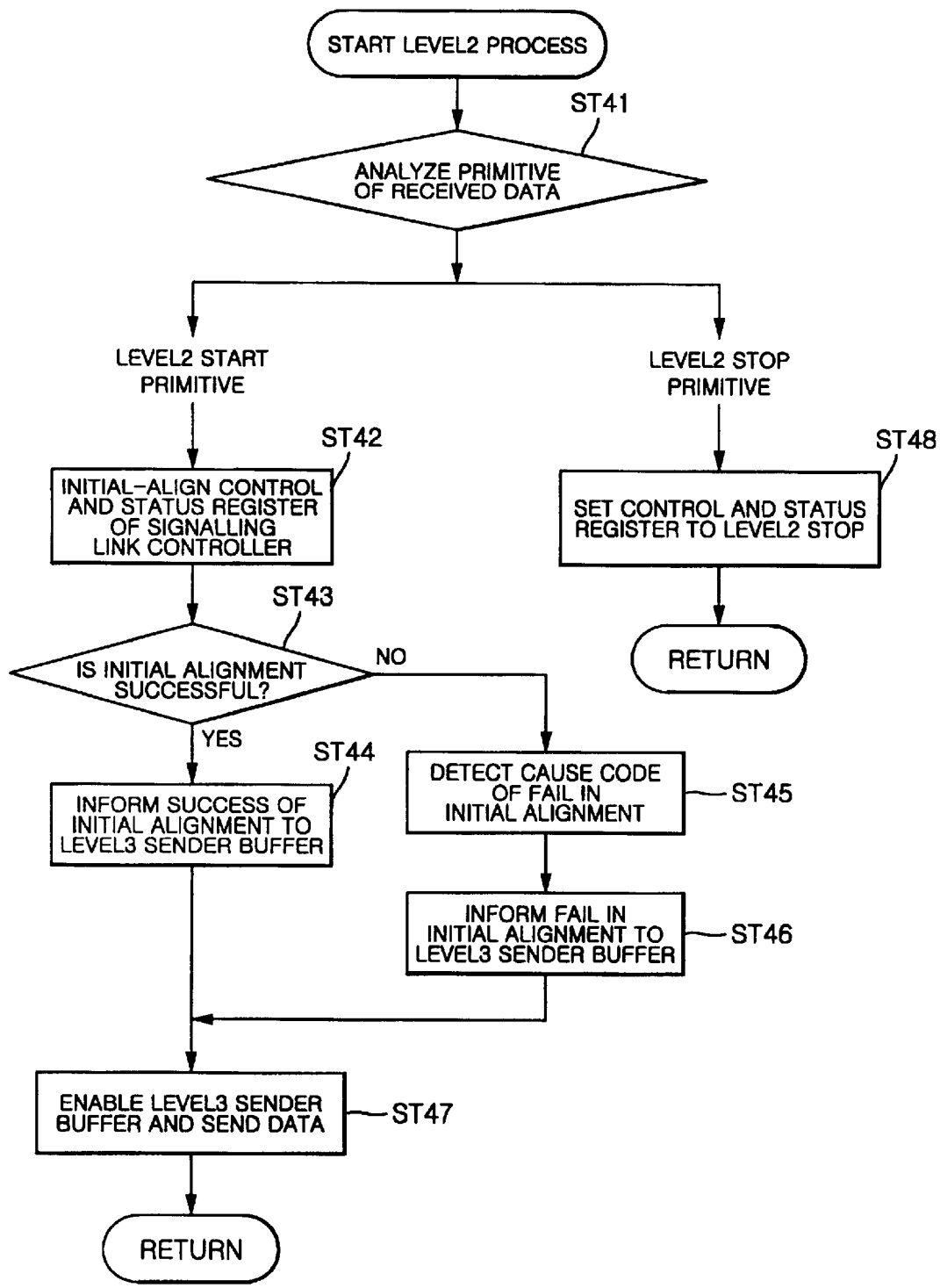
FIG. 8 is a flow chart illustrating the level 2 processing step depicted in FIG. 5 in detail.

FIG. 8 is a flow chart illustrating the level 2 processing step depicted in FIG. 5 in detail. As shown in FIG. 8, the level 2 processing step comprises the steps of: if the primitive of the received data is a level 2 start, initial-aligning the control and status register of signalling link controller 140 (ST41 and ST42); informing the result of the initial-aligning to the level 3 sender buffer, enabling the level 3 sender buffer, sending data, and returning (ST43–ST47); and, if the primitive of the received data is a level 2 stop, setting the control and status register to the level 2 stop and returning (ST48).

Specifically, if the level 3 sends a primitive of "level 2 start?", the level 2 performs the initial alignment. In other words, the primitive of the received data is the level 2 start, the control and status register is initial-aligned (ST41 and ST42).

Whether or not the initial alignment is successful is determined (ST43). If the initial alignment is successful, the success of the initial alignment is informed to the level 3 sender buffer (ST44). If the initial alignment ends in failure, a cause code of the failure in the initial alignment is detected and the failure in the initial alignment is informed to the level 3 sender buffer (ST45 and ST46).

After detecting that the initial alignment is successful, ID the level 3 sender buffer is enabled for transmission of the message (ST47).

The transmission of the message is performed as follows. Signalling link controller 140 receives a status indication "out of service" (SIOS) from the other office and sends a signalling unit called a status indication "out of alignment" (SIO) to the other office. A signalling terminal in the other office then receives the signalling unit. Similarly, if signalling link controller 140 sends the SIO signalling unit, signalling link controller 140 sends a signalling unit called a status indication "normal" (SIN) (or status indication "emergency" (SIE)).

In the same manner, the signalling terminal in the other office receives the SIN (or SIE) signalling unit, it also sends the SIN (or SIE) signalling unit to the present office. If signalling link controller 140 receives the signalling unit and sends a fill-in signal unit (FISU), the level 2 is activated. The level 2 sends to the level 3, a primitive of "initial success" indicating that the initial alignment is successfully completed.

When the initial alignment ends in failure, that is, when the signalling units such as SIOS, SIO, SIN, and SIE are not received in normal during the initial alignment, or when any one of multiple timers is timeout, the level 2 sends to the level 3, a primitive of "initial fail" indicating that the initial alignment ends in failure.

If the primitive of the received data is the level 2 stop, the control and status register is set to the level 2 stop state and bits 9, 10, and 14 are set to "1" to stop the level 2 process (ST48).

Figure 9B:
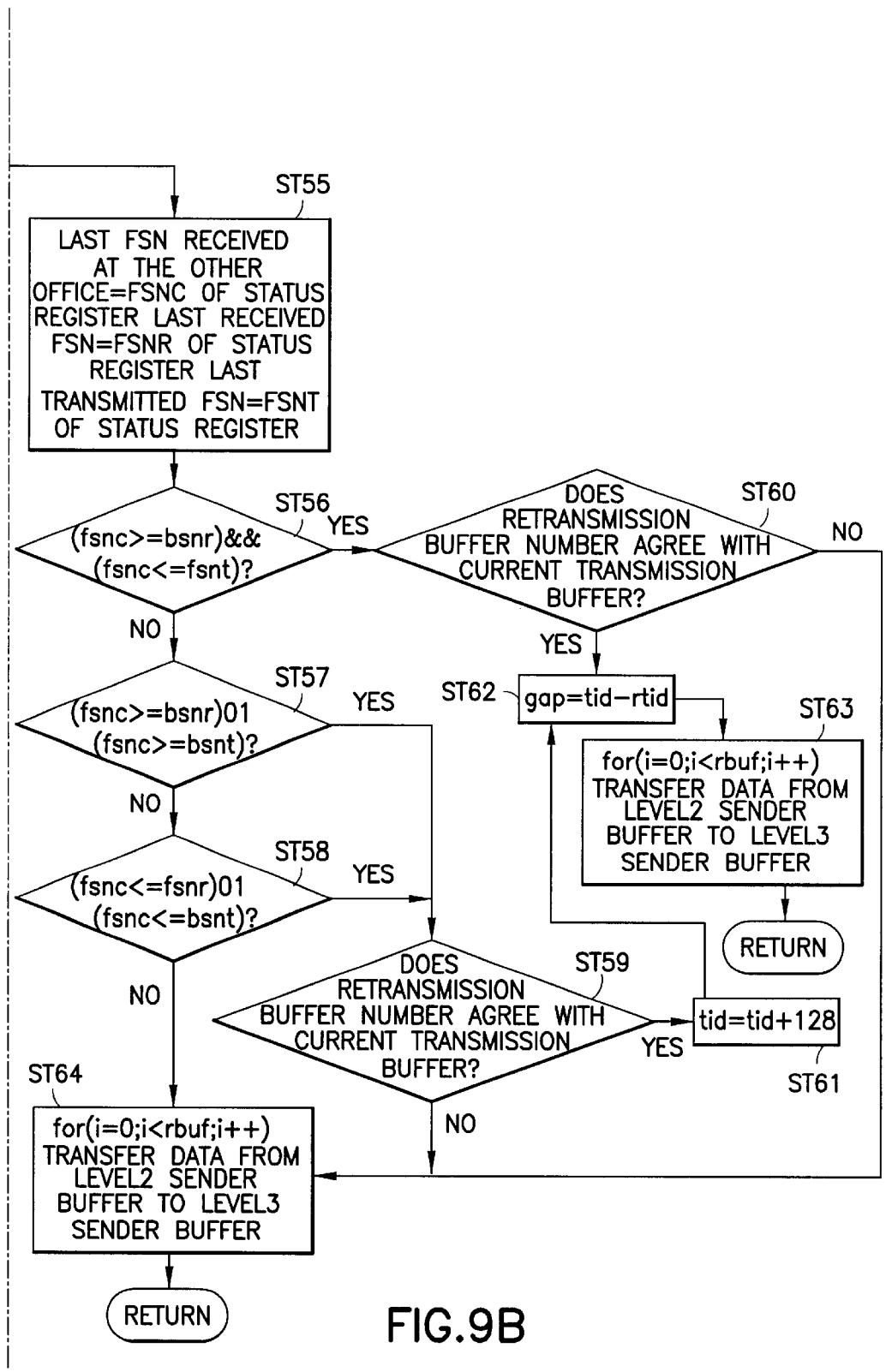
FIG. 9 is a flow chart illustrating the signalling 15 message processing step depicted in FIG. 5 in detail.

FIG. 9 is a flow chart illustrating the signalling message processing step depicted in FIG. 5 in detail. As shown in FIG. 9, the signalling message processing step includes the steps of: transferring the signalling message in a level 3 receiver buffer to the level 3 sender buffer and sending the signalling message (ST51–ST53); if the primitive of the received data is a signalling message retransmission, setting a retransmission initial buffer display, a content of the display, and a current transmission display and setting a last forward sequence number received by the other office, a last forward sequence number received by the present office, and a last forward sequence number transmitted by the present office (ST54 and ST55); and comparing the forward sequence number last received by the other office with a last backward sequence number received by the present office, comparing the last forward sequence number received by the other office with the last forward sequence number transmitted by the present office, and transferring data from the level 2 sender buffer to the level 3 sender buffer (ST56–ST64).

In the setting steps (ST54 and ST55), the retransmission initial buffer display is made to display retransmission of a status register, the content of the display and the current transmission display are set to a current transmission display of the status register, a last transmitted forward sequence number (FSN) is set to the other office's last received forward sequence number current (FSNC) of the status register, a last received forward sequence number (FSN) is set to the forward sequence number received (FSNR) at the status register, and a last transmitted forward sequence number (FSN) is set to the forward sequence number transmitted (FSNT) from the status register.

In the step of comparing the last forward sequence number received at the other party with the last backward sequence number received (BSNR) at the present party, comparing the last forward sequence number received at the other party with the last forward sequence number transmitted from the present party, and transferring data from the level 2 sender buffer to the level 3 sender buffer (ST56–ST64), the last FSNC of the other party is compared with the last BSNR of the present party and the FSNC of the other party is compared with the last FSNT of the present party (ST56); if the FSNC of the other party is equal to or more than the BSNR of the present party and the FSNC of the other party is less than the FSNT of the present party, a retransmission buffer number is compared with a primary transmission buffer number to check whether or not they agree with each other (ST57–ST60); if the retransmission buffer number does not agree with the primary transmission buffer number, data is transferred from the level 2 sender buffer to the level 3 sender buffer for an interval corresponding to a value obtained by subtracting the retransmission buffer number from the primary transmission buffer number (ST61–ST63); and, if the FSNC of the other party is less than the BSNR of the present party or if the FSNC of the other party is equal to or more than the FSNT of the present party and/or if the retransmission buffer number does not agree with the primary transmission buffer number, data is transferred from the level 2 sender buffer to the level 3 sender buffer for an interval corresponding to a value of the retransmission buffer (ST64).

Specifically, if the primitive of the received data is the transmission of the signalling message, the signalling message in the level 3 receiver buffer is transferred to the level 3 sender buffer for transmission of the signalling message (ST51–ST53).

If the primitive of the received data is the retransmission of the signalling message, the retransmission initial buffer display, the content of the display, and the current transmission display are set and the last froward sequence number received by the other office, the last forward sequence number received by the present office, and the last forward sequence number transmitted by the present office are set (ST54 and ST55).

The last forward sequence number received by the other office is compared with the last backward sequence number received by the present office and the last forward sequence number received by the other office is compared with the last forward sequence number transmitted by the present office. In this way, the signalling system between offices assigns sequence numbers to frames during the No. 7 communication so that the frames are checked whether or not they are well transmitted (ST56–ST58).

Whether or not messages are transmitted and received between two ends of the signalling link is detected using their sequence numbers. If a message is lost during the transmission, the transmission should be restarted from the lost message. If the last FSNC of the other party is equal to or more than the last BSNR and the last FSNC of the other party is less than the last FSNT, the retransmission buffer number is compared with the primary transmission buffer number to check whether they matches. In such manner described above, sequence of transmit and receive of a message is compared and a retransmission number is compared (ST59 and ST60).

If the retransmission buffer number does not agree with the primary transmission buffer number, data is transferred from the level 2 sender buffer to the level 3 sender buffer during a gap between the primary buffer number and the retransmission buffer number. If the sequence numbers of the message do not agree, this means that some messages are lost during the transmission and the messages from the lost one to the current message should be retransmitted, so the messages corresponding to the gap should be retransmitted (ST61–ST63).

If the last FSNC of the other party is less than the last BSNR or if the last FSNT of the other party is equal to or more than the last FSNT and/or if the retransmission buffer number does not agree with the primary transmission buffer number, the data is transferred from the level 2 sender buffer to the level 3 sender buffer for the interval corresponding to the retransmission buffer value and the progress returns (ST64).

Figure 10:
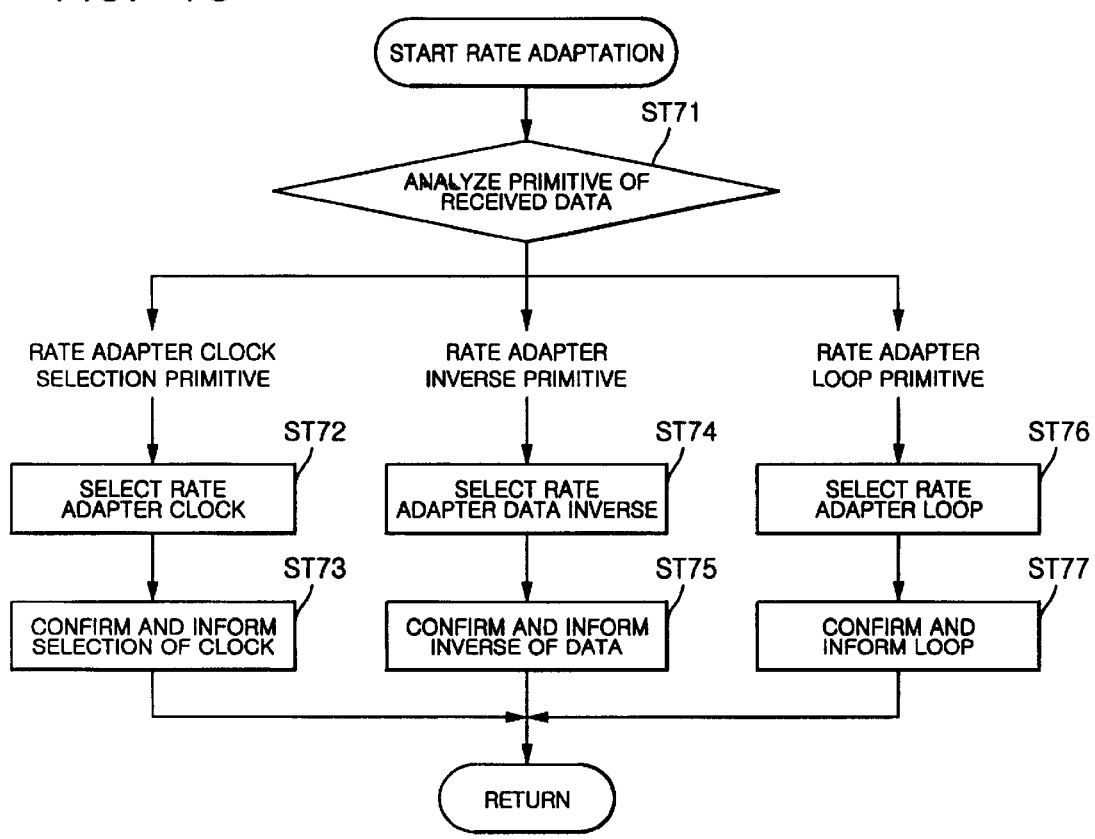
FIG. 10 is a flow chart illustrating the rate adapting step depicted in FIG. 5 in detail.

FIG. 10 is a flow chart illustrating the rate adaptation step depicted in FIG. 5 in detail. As shown in FIG. 10, the step comprises the steps of: if the primitive of the received data is a rate adapter clock selection, selecting a rate adapter clock for either the level 2 or the level 3 and informing the selection (ST71–ST73); if the primitive of the received data is an inverse of a rate adapter, selecting an inverse of rate adapter data and informing the completion of inverse of the data (ST74 and ST75); and if the primitive of the received data is a rate adapter loop, selecting a loop of the rate adapter and informing the completion of the loop (ST76–ST77).

If the primitive of the received data is about rate adaptation for the level 2 process and the level 3 process, the rate adaptation between the level 2 and the level 3 is performed. In other words, the rate adapter clock is selected, the rate adapter is inverted, and the rate adapter loop function is performed, thus solving the problem which can be caused by difference between rates for the level 2 process and the level 3 process. The rate adapter clock is selected because if a trunk line E1 is used, a rate of a single channel is 64 kbps and if T1 is used, a rate of a single channel is 56 kbps.

Figure 11B:
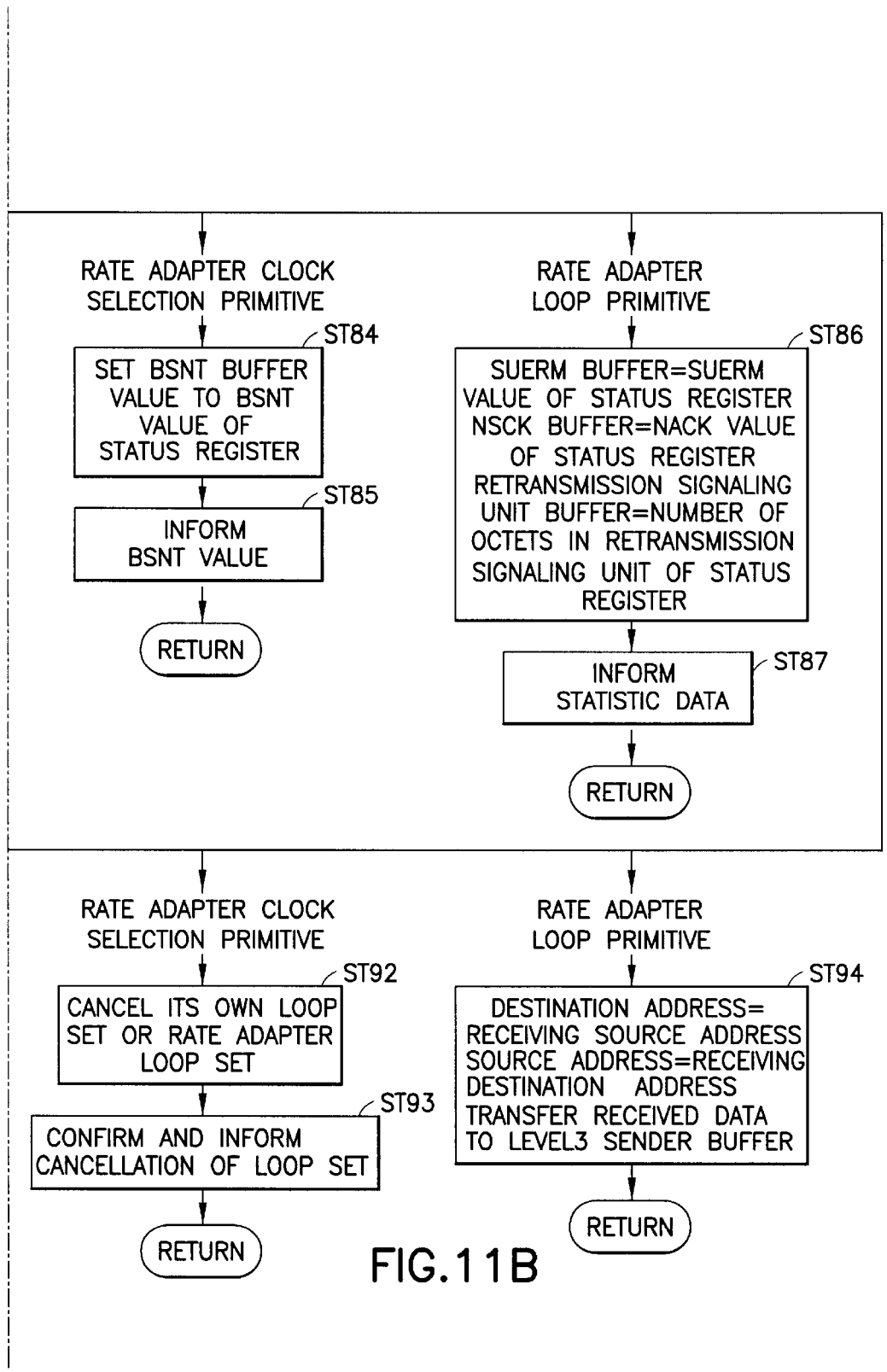
FIG. 11 is a flow chart illustrating the step of managing the signalling link controller depicted in FIG. 5 in detail.

FIG. 11 is a flow chart illustrating the step of managing the signalling link controller depicted in FIG. 5 in detail. As shown in FIG. 11, the management step comprises the steps of: if the primitive of the received data is a power-off, setting the control and status register to the power-off state (ST81 and ST82); if the primitive of the received data is a power-on, setting the control and status register to the power-on state (ST83); if the primitive of the received data is a backward sequence number request, setting a buffer value of a last backward sequence number transmitted (BSNT) to a value of the last BSNT of the control and status register and informing a response of the value of the last BSNT (ST84 and ST85); if the primitive of the received data is a statistic request, setting an SUERM buffer, a NACK buffer, and a retransmission signalling unit buffer and informing statistic data based upon the set values for the process of the statistic request (ST86 and ST87); if the primitive of the received data is a designation of a routing address, setting an address buffer of a signalling subsystem handling processor (SSHP) to an SSHP's routing address received and informing the confirm of reception of the routing address (ST88 and ST89); if the primitive of the received data is a loop request, setting its own loop or the rate adapter's loop and informing the setting of the loop (ST90 and ST91); if the primitive of the received data is a loop cancellation request, cancelling its own loop set or the rate adapter's loop set and informing the cancellation of the loop set (ST92 and ST93); and, if the primitive of the received data is a test communication between processors, setting a destination address to a receiving source address and setting a source address to a source destination address to transfer the received data to the level 3 sender buffer to thereby perform the test communication (ST94).

In the step of processing the statistic request (ST86), the SUERM buffer is set to an SUERM value of the status register, the NACK buffer is set to a NACK value of the status register, and the retransmission signalling unit buffer is set to the number of octets in a retransmission signalling unit.

If the "power-off" primitive is received, a user primitive of the control and status register in signalling link controller 140 and user primitive available bits are set. The user primitive of the control and status register and the user primitive available bits are then reset to allow a buffer descriptor ring of signalling link controller 140 to be read. To detect a current link state of signalling link controller 140, the control and status register is set in the same manner as described above. If the "power-on" primitive is received from the level 3, the "power-on" primitive is activated on the control and status register in signalling link controller 140. A signalling unit of SIOS (or TSK) is then sent toward the other office (ST81–ST83).

If the backward sequence number request primitive is received, a buffer of the last BSNT is set to a value of the last BSNT of the status register and the value of the last BSNT is acknowledged (ST84 and ST85).

If the primitive of the received data is the statistic request, the SUERM buffer is set to the SUERM value of the status register, the NACK buffer is set to the NACK value of the status register, and the retransmission signalling unit buffer is set to the number of octets in the retransmission signalling unit (ST86). Then statistic data based upon the set values is informed, that is, statistic data contained in first to fourth signalling link controllers 141–144 is read and a message is sent to the level 3 (ST87).

To transmit the message to the level 3, an address of a board where the level 3 is embedded is required, so a routing address should be designated. When transmitting and receiving a message to and from the level 3, this routing address is embedded in an address within the message. If the primitive of the received data is the designation of the routing address, the address buffer of the signalling subsystem handling processor (SSHP) is set to the SSHP's routing address received and the reception of the routing address is confirmed and informed. If the primitive of the received data is the loop request, its own loop or the rate adapter is set and completion of loop set is informed. If the primitive of the received data is the loop cancellation request, its own loop or the rate adapter loop set is cancelled and completion of cancellation of the loop set is informed. When the level 3 requests a loop to support a self-test function, the rate adapter connects transmit toward receive to support the loop function and independently sets transmission/reception when canceling the loop (ST88–ST93).

Finally, if the primitive of the received data is the test communication between processors, the destination address is set to the receiving source address and the source address is set to the source destination address to transfer the received data to the level 3 sender buffer (ST94).

Accordingly, the present invention can process more than one level 2 protocols in real time by implementing a level 2 signalling link at a message transfer part in a common channel signalling system.

As illustrated above, the No. 7 level 2 processing system for a mobile communication switching unit and method of control thereof according to the present invention can process four level 2 protocols in real time by implementing four level 2 signalling links at a message transfer part in a common channel signalling system, whereby commercial feasibility of the system is enhanced and an SS No. 7 function can be provided with less space by reducing space for racks in the switching unit.

It will be apparent to those skilled in the art that various modifications and variations can be made in No. 7 level 2 processing system for a mobile communication switching unit and its control method of the present invention without deviating from the spirit or scope of the invention. Thus, it is intended that the present invention cover the modifications and variations of this invention provided they come within the scope of the appended claims and their equivalents.

What is claimed is:

1. A No. 7 level 2 processing system for a mobile communication switching unit, said system comprising:
    a central processing unit for overall controlling the level 2 processing system via a system bus;
    a ROM for storing programs to be executed at said central processing unit;
    a RAM for storing data which has been processed at said central processing unit;
    a signalling link controller for processing level 2 protocols which are signalling terminals under control of said central processing unit, said signalling link controller comprising first to fourth signalling link controllers for processing level 2 protocols which are signalling terminals under the control of said central processing unit and first to fourth sender/receiver buffers for performing a buffering function for data transmission between said central processing unit and said first to fourth signalling link controllers; and
    a rate adapter for extracting time slots from the signalling terminals processed by said signalling link controller and performing multiplexing and demultiplexing to allow packets to be processed.

2. A method of controlling a No. 7 level 2 processing system for a mobile communication switching unit, said method comprising the steps of:
    1) initializing internal devices of a central processing unit and a control function of a signalling link controller;
    2) after the step 1), processing data of said signalling link controller received by said central processing unit to thereby perform transmit/receive to/from an upper level;
    3) checking status of a level 3 receiver buffer within said central processing unit and analyzing a primitive of data which has been received from a level 3 but not processed; and
    4) controlling the primitive to be performed at said signalling link controller according to a result of analyzing the primitive of the received data and returning to the step 2).

3. The method according to claim 2, wherein said initializing step 1) comprises the steps of:
    setting a control and status register to an interrupt unrecognizable state to make all interrupts received from a plurality of signalling link controllers to be unrecognized;
    after setting said register to the interrupt unrecognizable state, initializing a plurality of sender/receiver buffers, registering interrupt vectors, initializing a serial communication controller and first and second independent direct memory access controllers (IDMA) within said central processing unit, initializing parameters for level 2 process, and initializing a buffer descriptor and register within said central processing unit; and
    after the initialization, setting the control and status register to an interrupt recognizable state to make all interrupts received from said plurality of signalling link controllers to be recognized.

4. The method according to claim 2, wherein said step of processing the data of the signalling link controller received by the central processing unit comprises the steps of:
    checking a buffer of a serial communication controller within said central processing unit to determine whether or not there is any data which has not been processed;
    if there some data which has not been processed in said buffer of said serial communication controller, transferring said data in said serial communication controller's buffer to a first independent direct memory access controller and checking a level 3 receiver buffer of said first independent direct memory access controller to determine whether or not there is any data which has not been processed;
    if there is no data which has not been processed in said serial communication controller's buffer or said level 3 receiver buffer, checking a plurality of sender/receiver buffers to determine whether or not there is any data which has not been processed;
    if there is some data which has not been processed in said plural sender/receiver buffers, transferring said data to a level 3 receiver buffer of a second independent direct memory access controller for transmission of said data and returning to said step of checking the buffer of the serial communication controller; and
    if there is some data which has not been processed in said level 3 receiver buffer, analyzing a primitive of the data received from the level 3.

5. The method according to claim 2, wherein said step 4) comprises the steps of:
    if the primitive of the received data is a level 2 process primitive, performing a level 2 process for a signalling link;
    if the primitive of the received data is a signalling message process primitive, performing a signalling message process;
    if the primitive of the received data is a rate adaptation primitive, performing rate adaptation to adjust processing speed in accordance with the level 2 or the level 3; and
    if the primitive of the received data is a signalling link controller management primitive, performing a function for managing the signalling link controller.

6. The method according to claim 5, wherein said level 2 processing step comprises the steps of:
    if the primitive of the received data is a level 2 start, initial-aligning a control and status register of the signalling link controller;
    informing a result of the initial-aligning to a level 3 sender buffer, enabling the level 3 sender buffer, sending the data, and returning; and
    if the primitive of the received data is a level 2 stop, setting the control and status register to the level 2 stop and returning.

7. The method according to claim 5, wherein said signalling message processing step comprises the steps of:

transferring a signalling message in a level 3 receiver buffer to a level 3 sender buffer and sending the signalling message;

if the primitive of the received data is a signalling message retransmission, setting a retransmission initial buffer display, a content of the display, and a current transmission display and setting a last forward sequence number received by the other office, a last forward sequence number received by the present office, and a last forward sequence number transmitted by the present office; and comparing the last forward sequence number received by the other office with a last backward sequence number received by the present office, comparing the last forward sequence number received by the other office with the last forward sequence number transmitted by the present office, and transferring data from a level 2 sender buffer to the level 3 sender buffer.

8. The method according to claim 7, wherein, in said setting step, said retransmission initial buffer display is made to display retransmission of a status register, said content of said display and said current transmission display are set to a current transmission display of a status register, a last transmitted forward sequence number (FSN) is set to said other office's last received forward sequence number current (FSNC) of the status register, a last received forward sequence number (FSN) is set to said forward sequence number received (FSNR) at the status register, and a last transmitted forward sequence number (FSN) is set to said forward sequence number transmitted (FSNT) from the status register.

9. The method according to claim 7, wherein said step of comparing the last forward sequence number received at the other party with the last backward sequence number received (BSNR) at the present party, comparing the last forward sequence number received at the other party with the last forward sequence number transmitted from the present party, and transferring data from the level 2 sender buffer to the level 3 sender buffer, said step comprises the steps of:

comparing the last FSNC of the other party with the last BSNR of the present party and comparing the FSNC of the other party with the last FSNT of the present party;

if the FSNC of the other party is equal to or more than the BSNR of the present party and the FSNC of the other party is less than the FSNT of the present party, comparing a retransmission buffer number with a primary transmission buffer number to check whether or not they agree with each other;

if the retransmission buffer number does not agree with the primary transmission buffer number, transferring the data from the level 2 sender buffer to the level 3 sender buffer for an interval corresponding to a value obtained by subtracting the retransmission buffer number from the primary transmission buffer number; and if the FSNC of the other party is less than the BSNR of the present party or if the FSNC of the other party is equal to or more than the FSNT of the present party and/or if the retransmission buffer number does not agree with the primary transmission buffer number, transferring the data from the level 2 sender buffer to the level 3 sender buffer for an interval corresponding to a value of the retransmission buffer.

10. The method according to claim 5, wherein said rate adaptation step comprises the steps of:

if the primitive of the received data is a rate adapter clock selection, selecting a rate adapter clock for either the level 2 or the level 3 and informing the selection;

if the primitive of the received data is an inverse of a rate adapter, selecting an inverse of rate adapter data and informing completion of the inverse of the data; and if the primitive of the received data is a rate adapter loop, selecting a loop of the rate adapter and informing completion of the loop.

11. The method according to claim 5, wherein said step of managing the signalling link controller comprises the steps of:

if the primitive of the received data is a power-off, setting a control and status register to the power-off state;

if the primitive of the received data is a power-on, setting the control and status register to the power-on state;

if the primitive of the received data is a backward sequence number request, setting a buffer value of a last backward sequence number transmitted (BSNT) to a value of the last BSNT of the control and status register and informing a response of the value of the last BSNT;

if the primitive of the received data is a statistic request, setting a signalling unit error rate monitoring (SUERM) buffer, a NACK buffer, and a retransmission signalling unit buffer and informing statistic data based upon the set values for the process of the statistic request;

if the primitive of the received data is a designation of a routing address, setting an address buffer of a signalling subsystem handling processor (SSHP) to an SSHP's routing address received and informing confirmation of reception of the routing address;

if the primitive of the received data is a loop request, setting its own loop or a rate adapter's loop and informing setting of the loop;

if the primitive of the received data is a loop cancellation request, cancelling its own loop set or the rate adapter's loop set and informing cancellation of the loop set; and if the primitive of the received data is a test communication between processors, setting a destination address to a receiving source address and setting a source address to a source destination address to transfer the received data to a level 3 sender buffer to thereby perform the test communication.

12. The method according to claim 11, wherein, in said step of processing the statistic request, said SUERM buffer is set to an SUERM value of a status register, said NACK buffer is set to a NACK value of the status register, and said retransmission signalling unit buffer is set to the number of octets in a retransmission signalling unit.

* * * * *